United States Patent
Anthony

[15] 3,651,954
[45] Mar. 28, 1972

[54] AUTOMATIC LOADING WITH EXPANDING ARBOR

[72] Inventor: Russell W. Anthony, Harper Woods, Mich.
[73] Assignee: Lear Siegler Inc., Santa Monica, Calif.
[22] Filed: Apr. 6, 1970
[21] Appl. No.: 25,648

[52] U.S. Cl. .................................214/1 Q, 82/44, 269/51, 279/2
[51] Int. Cl. ....................................B23b 31/26, B23b 31/40
[58] Field of Search......................................82/44; 269/48.1–52; 279/2; 214/1 Q

[56] References Cited

UNITED STATES PATENTS

| 3,026,115 | 3/1962 | Brauer, Jr. et al. | 279/2 |
| R26,248 | 8/1967 | Anthony | 279/2 X |
| 2,957,699 | 1/1960 | Dixon et al. | 279/2 |

Primary Examiner—Theron E. Condon
Assistant Examiner—Neil Abrams
Attorney—Whittemore, Hulbert & Belknap

[57] ABSTRACT

Automatic loading mechanism in which a rotary support includes an expanding arbor. The support is moved between a loading and a working station and while in the loading station the arbor is in unexpanded condition to permit unloading and loading of work pieces.

6 Claims, 2 Drawing Figures

PATENTED MAR 28 1972 3,651,954
FIG.1
FIG.2
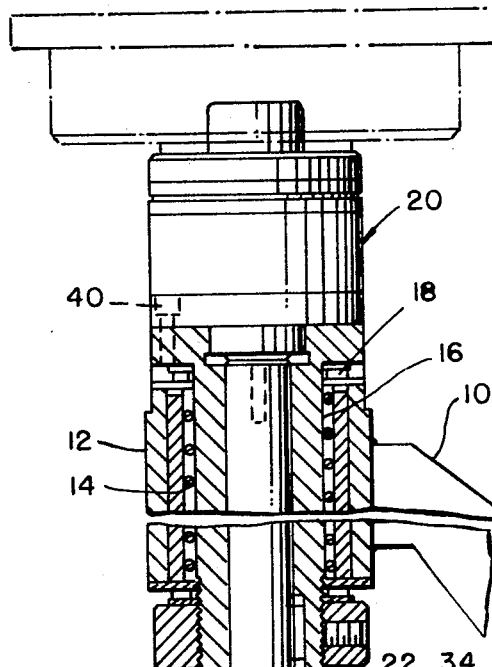
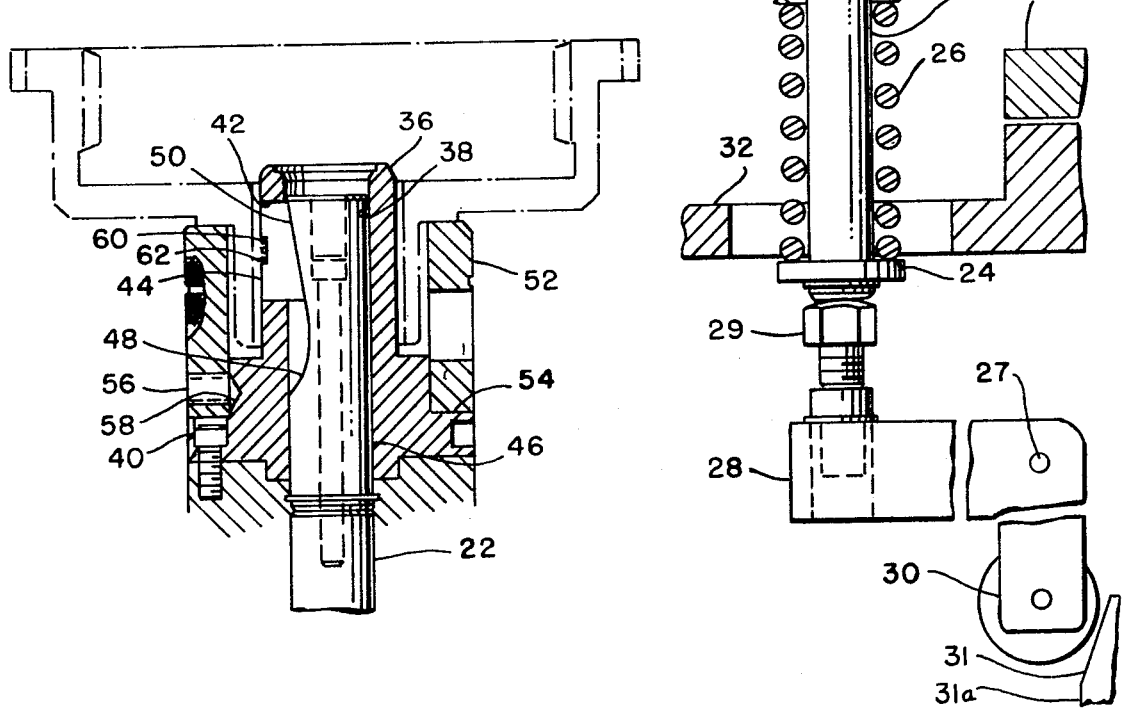
INVENTOR
RUSSELL W. ANTHONY
BY Whitemore.
Hulbert
Belknap ATTORNEYS

AUTOMATIC LOADING WITH EXPANDING ARBOR

BRIEF SUMMARY OF THE INVENTION

In accordance with the present invention, a work support is provided in the form of a cup or tubular arbor member having circumferentially spaced openings in its side walls. Keys are provided in the openings and are urged inwardly by a contractile spring. Camming means are provided in the form of a plug movable axially in the cup, the plug having inclined camming surfaces engaging correspondingly inclined inner surfaces on the keys.

A draw bar is connected to the plug and a spring is interposed between the draw bar and the cup urging the plug in a direction to cam the keys radially outwardly.

The plug is a part of a rotary spindle which is shifted axially with the arbor member from a loading position in which automatic loading equipment moves a work piece into position to be engaged by the expanding arbor and advance with it to the working position. Cam means are provided operating on the draw bar and effective to shift the draw bar against the spring in a direction to release the keys for radial inward movement as the expanding arbor moves into the loading position. This releases a finished work piece for removal and permits its replacement by a new work piece in position to be picked up upon the next succeeding movement of the arbor from loading to working position.

It will be understood that the apparatus disclosed herein is capable of use on any machine or instrument in which a rotary work piece is to be supported for rotation on an arbor and in which the arbor is automatically operated to effect clamping and release of the work piece in association with automatic loading and unloading equipment.

BRIEF DESCRIPTION OF THE DRAWINGS

FIG. 1 is a vertical elevational view, party in section, of automatic loading equipment including the expanding arbor.

FIG. 2 is an enlarged detailed sectional view of the expanding arbor.

DETAILED DESCRIPTION

The present invention is applicable to any type of machine tool or gauging equipment operable on work pieces intended for rotation during a machining or checking operation. The apparatus comprises a stationary support (not shown) upon which there is provided a vertically movable frame a portion of which is indicated at 10, which carries an elongated tubular housing 12 within which is located an elongated ball type bushing 14 in which a shaft 16 is rotatable. In addition, thrust bearings indicated at 18 are provided at opposite ends of the housing 12.

Connected to the upper end of the shaft 16 is expanding arbor mechanism indicated generally at 20, details of which will be subsequently described.

For the present it is sufficient to note that operation of the expanding arbor is dependent upon vertical movement of a draw bar 22 which is longitudinally movable in the shaft 16. At its lower end the draw bar has an annular spring abutment 24 which is engaged by a compression spring 26 the upper end of which seats against the lower end of the shaft 16. It will be observed that the compression spring 26 urges the draw bar downwardly with respect to the shaft 16, and as will subsequently be described, this results in outward camming movement of work supporting keys.

Mounted on and vertically movable with the frame 10 is a bell crank pivoted at 27, one arm of which is indicated at 28. The arm 28 includes an adjustable abutment screw 29 which is engageable with the lower end of the draw bar 22 when the frame 10 nears its lowermost position. Specifically, this is accomplished by providing a depending arm 30 which carries a roller which is engageable with a camming surface, a portion of which is diagrammatically indicated at 31, having a dwell portion 31a.

In the operation of the machine or checker loading equipment is provided on the stationary support surface indicated at 32 and includes a transversely movable pusher means including member 34, the member 34 being operable to shift a completed work piece away from the path of the arbor for replacement by the next succeeding work piece.

At this time the finished work piece may be pushed off or otherwise removed from the member 34 and replaced with another work piece which will thus be held in position directly above the expanding arbor. As the arbor approaches its lowermost position the arm 28 is cammed upwardly to push the draw bar against the spring 26 so as to release the clamping action of the expanding arbor. Similarly, when the arbor moves upwardly from its initial position, it first enters the central opening in the work piece and after a short initial movement the arm 28 is released and the spring 26 is effective through the draw bar 22 to expand the arbor so as to grip the work piece firmly in operating position.

Reference is now made to FIG. 2 which shows the expanding arbor enlarged and in detail. The expanding arbor comprises a cup or tubular arbor member 36 having a cylindrical opening 38 extending therethrough. The member 36 is attached to the upper end of the shaft 16 by screws indicated generally at 40. A plurality, as for example three, openings 42 are provided to extend radially through the side wall of the member 36. These openings 42 are uniformly spaced circumferentially around the member and receive keys 44 which are radially movable therein and are adapted to be cammed outwardly to engage the interior surface of the work piece W.

Connected to the upper end of the draw bar 22 is a plug 46 having formed therein a plurality of slots 48, the bottom walls of the slots including inclined portions 50. The inner surfaces of the keys 44 are correspondingly inclined and engage the surfaces 50.

An annular member 52 is seated against the upper surface of a radially extending flange 54 on the arbor member 36. The annular member 52 is retained in position by pointed screws 56 engaging in conical recesses 58 formed in the member 36.

The keys 44 are provided with recesses 60 in their outer edges which receive spring means 62 urging the keys inwardly.

With the construction as just described, it will be observed that when the lower end of the draw bar is out of engagement with the adjustable abutment 29 on the arm 28, the spring 26 draws the draw bar and plug 46 downwardly, thus camming the keys 44 outwardly into firm locating and driving relation to inner surfaces on the work piece W. As the frame 10 moves downwardly to shift the work pieces to loading and unloading position, the arm 28 is operated prior to completion of the downward stroke, thus leaving the work piece W, which may be retained on a portion of the loading fixture as the arbor continues downwardly to the end of its stroke. The finished or checked work piece is then removed and a new work piece is located in position directly above the arbor. The arbor is then moved upwardly with its keys in radially inward position so that the arbor enters freely into the opening in the work piece. At this time the work piece is located by its engagement with the upper flat surface of the annular member 52. It will of course be usual practice in this case to provide an accurate surface on the work piece for engagement with the member 52. As the arbor continues its upward movement the cam means associated with the arm 28 releases the arm and the spring 26, through the draw bar, pulls the plug 46 downwardly, thus camming the keys 44 outwardly into firm engagement with the work piece.

I claim:

1. Automatic loading equipment for rotatable work pieces each having a central locating opening comprising a housing, a rotatable shaft in said housing having tubular arbor member secured thereto and projecting beyond an end of said housing, said arbor member having a plurality of axially elongated circumferentially spaced slots extending therethrough, radially movable keys in said slots, cam means comprising a plug movable axially in said tubular arbor member and having inclined cam surfaces in registration with and engaged by said keys, a draw bar connected to said plug, a spring interposed between said draw bar and shaft to urge said draw bar in a direction to cam said keys outwardly, means for shifting said housing in a direction parallel to the axis of said arbor to move said arbor member between a loading position and a working position, a support for a work piece having an opening through which said arbor member can pass adapted to support a work piece in position to receive said arbor member upon movement thereof from loading to working position and to strip a work piece from said arbor member upon movement thereof into loading position, and release means operable upon movement of said arbor member into loading position to move said draw bar against said spring to move said plug to release said keys for radial releasing movement.

2. Equipment as defined in claim 1 in which said housing is vertically movable, and said release means comprises a cam, and a lever having one arm engaging said cam and another arm engaging the end of said draw bar.

3. Equipment as defined in claim 2, in which said support comprises means for supporting a work piece in position above said arbor member when said arbor member is in loading position, said cam being dimensioned to release said draw bar for actuation by said spring only after said arbor member has entered an opening in a work piece and has lifted the work piece from said supporting means.

4. Equipment as defined in claim 1, comprising a work-locating support ring surrounding said arbor member and having a locating surface at the top thereof arranged to engage a locating surface on a work piece and to lift it into partly located position prior to outward movement of said keys.

5. Equipment as defined in claim 4, said arbor member having a radial flange provided with an accurately formed flat locating top surface against which said ring is located and a plurality of tapered recesses in the outer surface of said plug within said ring, said ring having a like plurality of radially inwardly directed pointed-end screws engaging in said recesses and locking said ring in accurately located position on said arbor member.

6. Equipment as defined in claim 1 in which said housing is vertically movable, the axis of said shaft and arbor is vertical, said release means comprises a bell crank movable vertically with said housing and having one arm portion movable vertically against the lower end of said draw bar, and stationary cam means having an inclined camming portion and a vertical dwell portion, said bell crank having a second arm portion engageable with said cam means to release said keys as said hosing nears its lower loading position.

* * * * *